US009732488B2

(12) United States Patent
Pieper-Bailey et al.

(10) Patent No.: US 9,732,488 B2
(45) Date of Patent: Aug. 15, 2017

(54) DEVICE, SYSTEM, AND METHOD FOR SHOVELING AND SHAPING SNOW

(71) Applicant: DMOS Collective, Inc., Jackson, WY (US)

(72) Inventors: Susan Pieper-Bailey, Jackson, WY (US); John Hastings Koehler, Jackson, WY (US); Thomas Bennett, Salt Lake City, UT (US)

(73) Assignee: DMOS Collective, Inc., Jackson, WY (US)

( * ) Notice: Subject to any disclaimer, the term of this patent is extended or adjusted under 35 U.S.C. 154(b) by 0 days.

(21) Appl. No.: 15/171,415

(22) Filed: Jun. 2, 2016

(65) Prior Publication Data

US 2016/0356009 A1 Dec. 8, 2016

Related U.S. Application Data

(60) Provisional application No. 62/169,967, filed on Jun. 2, 2015.

(51) Int. Cl.
  *E01H 5/02* (2006.01)
  *B25G 1/04* (2006.01)
  (Continued)

(52) U.S. Cl.
  CPC .............. *E01H 5/02* (2013.01); *A01B 1/022* (2013.01); *A01B 1/04* (2013.01); *B25G 1/04* (2013.01)

(58) Field of Classification Search
  CPC .. E01H 5/02; A01B 1/022; A01B 1/04; A01B 1/22; B25G 1/04; B25G 1/06
  (Continued)

(56) References Cited

U.S. PATENT DOCUMENTS 1,202,791 A * 10/1916 Brownstein ............... E01H 5/02
  172/375
2,047,485 A * 7/1936 McBrady ............... A01B 1/022
  294/57

(Continued)

FOREIGN PATENT DOCUMENTS

EP  2484193 A1  8/2012

OTHER PUBLICATIONS

Young, Lee W., "International Search Report and Written Opinion re Application No. PCT/US16/35469", Sep. 22, 2016, pp. 12.

(Continued)

*Primary Examiner* — Dean Kramer
(74) *Attorney, Agent, or Firm* — Neugeboren O'Dowd PC (57) ABSTRACT

A handheld scooping and shaping device comprising a snow shaping section, a first hollow rigid shaft segment, a plurality of additional hollow rigid shaft segments, and a handle. The snow shaping section comprises a scooping panel, back panel, first sidewall, second sidewall, and bottom panel. The scooping panel comprises a distal end having a plurality of teeth extending outwardly. The back panel opposes the scooping panel. The first sidewall opposes the second sidewall. The bottom panel is coupled or integrated to the scooping panel, back panel, first sidewall and second sidewall. The first hollow rigid shaft segment is removably coupled to the snow shaping section. The plurality of additional hollow rigid shaft segments are configured to nest within at either the first hollow rigid shaft segment or an additional hollow rigid shaft segment. The handle is coupled or integrated to one of the additional hollow rigid shaft segments.

19 Claims, 6 Drawing Sheets

(51) Int. Cl.
  *A01B 1/02* (2006.01)
  *A01B 1/04* (2006.01)
(58) Field of Classification Search
  USPC .............. 294/54.5, 51, 57; 37/219, 265, 285
  See application file for complete search history.

(56) References Cited

U.S. PATENT DOCUMENTS

| | | | | |
|---|---|---|---|---|
| 3,751,058 | A | * | 8/1973 | Larsen ...................... E01H 5/02 280/30 |
| 3,882,569 | A | * | 5/1975 | Vanderveer ............. A47J 45/10 16/427 |
| D267,468 | S | * | 1/1983 | Simms ........................... 294/49 |
| 4,865,372 | A | * | 9/1989 | Gabriel .................... E01H 5/02 294/49 |
| 5,533,768 | A | * | 7/1996 | Mitchell .................. B25G 1/01 294/54.5 |
| 5,795,000 | A | * | 8/1998 | Aldorasi ................ A01B 1/022 294/57 |
| 6,003,915 | A | * | 12/1999 | Bierman .................. E01H 5/02 280/823 |
| D487,680 | S | * | 3/2004 | Sickler ............................. D8/10 |
| D568,121 | S | * | 5/2008 | Meyer .............................. D8/10 |
| 7,571,945 | B2 | * | 8/2009 | Walker .................. A01B 1/022 294/51 |
| 2004/0145197 | A1 | | 7/2004 | Kubicka et al. |
| 2007/0085359 | A1 | * | 4/2007 | Schouten ................ A47L 13/12 294/51 |
| 2014/0215864 | A1 | | 8/2014 | Fischer, Jr. et al. |

OTHER PUBLICATIONS

Bergaffe, "A Simple Tube with Lots of Possibilirtes", Retrieved from https://www.kickstarter.com/projects/bergaffe/bergaffe-a-simple-tube-with-lots-of-possibiliites, Jul. 10, 2014, pp. 10.

Ingram, David, "This Speciality Tools is Designed for Making Snowboard Jumps", Retrieved from http://www.trendhunter.com/trends/snowboard-jump, Dec. 3, 2015, pp. 14.

"Snow Shaper", Retrieved from https://web.archive.org/web/20110513181247/http://snowshaper.jp/products/snowshaper, May 13, 2011, pp. 2.

Kramer, Dean, "International Preliminary Report on Patentability Re Application No. PCT/US16/35469", dated May 19, 2017, pp. 7, Published in: US.

* cited by examiner

DEVICE, SYSTEM, AND METHOD FOR SHOVELING AND SHAPING SNOW

PRIORITY

This application claims priority to U.S. Provisional Application No. 62/169,967, entitled "Apparatus, System and Method for Shaping Snow," filed Jun. 2, 2015, and incorporated herein by reference in its entirety.

FIELD OF THE INVENTION

This application relates to a handheld device for scooping and shaping material. In particular, but not intended to limit the invention, the application relates to an expandable snow shovel.

BACKGROUND OF THE INVENTION

Terrain parks are outdoor winter recreation areas that allow snow sport enthusiasts, such as skiers, snowboarders and snowbikers to perform tricks, often aerial in nature. Prior to the growth of terrain parks within the boundaries of ski areas, ski areas generally banned jumping and aerial maneuvers, often under the penalty of revoking an offender's lift ticket or season pass. Therefore, snow sport enthusiasts looking to perfect aerial maneuvers were relegated to creating terrain parks in back-country areas. Given this history of out-of-bound terrain parks, and that many inbound terrain parks are frequently crowded, with long lines preceding popular jumps and terrain, as well as the cost of a lift ticket or season pass, many snow sport enthusiasts still prefer to venture into the backcountry to create their own terrain parks. However, with current snow shoveling and shaping tools, creating terrain park jumps in the backcountry is a very labor intensive project. Furthermore, current snow shaping tools are unwieldy and difficult to transport.

SUMMARY OF THE INVENTION

In order to overcome the deficiencies in the prior art snow shaping tools, a handheld scooping and shaping device was developed. One such device comprises a snow shaping section, and a first hollow rigid shaft segment removably coupled to the snow shaping section. The device further comprises a plurality of additional hollow rigid shaft segments configured to nest within at least one of the first hollow rigid shaft segment and another of the plurality of additional hollow rigid shaft segments. Finally, the device may comprise a handle that is coupled or integrated to an end of one of the additional hollow rigid shaft segments. The snow shaping section comprises a scooping panel. The scooping panel comprises a distal device end, with the distal device end having a plurality of teeth extending outwardly from the scooping panel. The snow shaping section also comprises a back panel, with the scooping panel generally opposing the back panel. The snow shaping section further comprises a first sidewall and second sidewall with the second sidewall substantially opposing the first sidewall. Finally, the snow shaping section comprises a bottom panel, with the bottom panel attached to the scooping panel, back panel, first sidewall, and second sidewall.

Another embodiment of the invention comprises a method of expanding a shovel. One such method comprises removing a plurality of rigid shaft segments from a shovel head. Upon removal the shaft segments from the shovel head, the method comprises placing at least one of the plurality of rigid shaft segments through a shovel head bore and coupling a scooping panel having a distal end of the at least one rigid shaft segment to the shovel head. After the rigid shaft segments are coupled to the shovel head, the plurality of rigid shaft segments are telescopically expanded to enable use of the shovel.

Yet another embodiment of the invention comprises a portable snow shaping system. One snow shaping system comprises a substantially planar bottom panel with a top surface disposed opposite a bottom surface. The system further comprises a distal end and a back panel disposed opposite the scooping panel with the bottom panel disposed between the scooping panel and the back panel. The system also comprises a first sidewall, a first shaft receiving bore disposed within the first sidewall, and a second sidewall disposed opposite the first sidewall with the bottom panel disposed between the first sidewall and the second sidewall. The first sidewall and the second sidewall of the snow shaping section extend from the bottom panel in a direction opposite the bottom surface of the bottom panel. A second shaft receiving bore is disposed within the second sidewall and a first hollow rigid shaft segment is removably coupled to the snow shaping section. A plurality of additional hollow rigid shaft segments are configured to nest within at least one of the first hollow rigid shaft segment and another of the plurality of additional hollow rigid shaft segments, and, in a device transport position, the first hollow rigid shaft segment and the plurality of additional hollow rigid shaft segments extend through the first shaft receiving bore and through the second shaft receiving bore.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Reference throughout this specification to "one embodiment," "an embodiment," and other similar language means that a particular feature, structure, or characteristic described in connection with the embodiment is included in at least one embodiment of the present invention. Thus, appearances of the phrases "in one embodiment," "in an embodiment,"

and similar language throughout this specification may, but do not necessarily, all refer to the same embodiment.

Furthermore, the described features, structures, or characteristics of the invention may be combined in any suitable manner in one or more embodiments. In the following description, numerous specific details are provided for a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
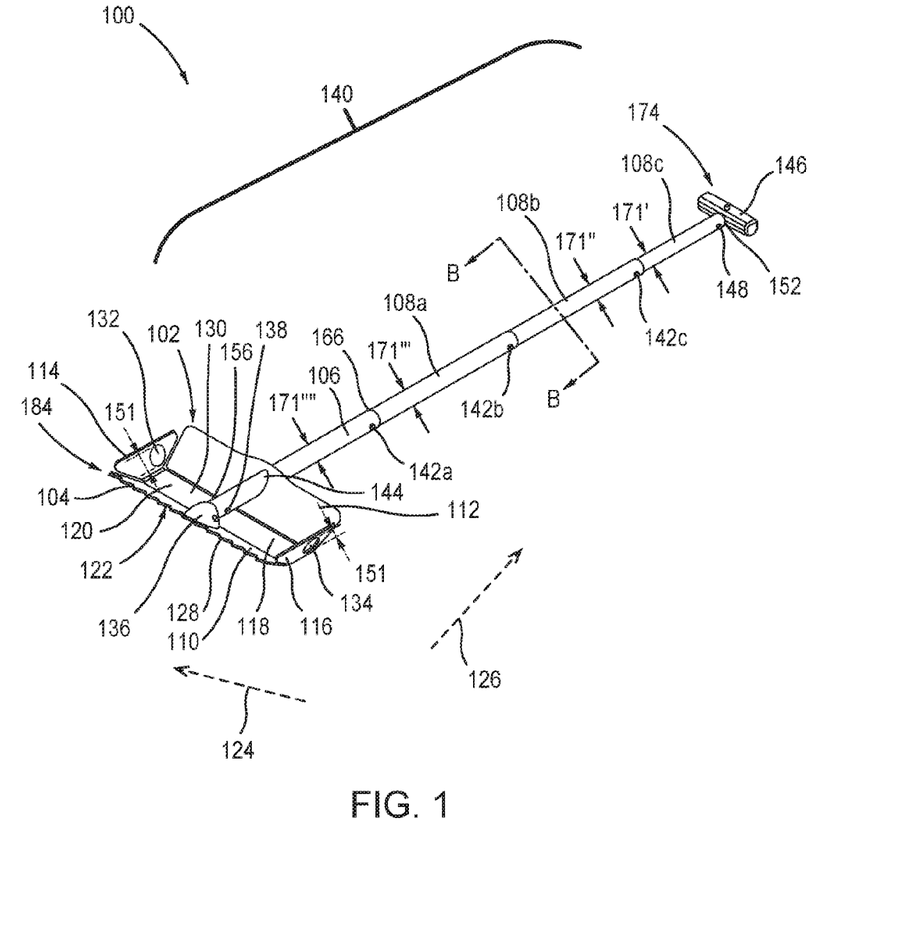
FIG. 1 depicts a perspective view illustrating one embodiment of a portable apparatus to shape snow in accordance with the present subject matter.

Turning first to FIG. 1, seen is a perspective view illustrating one embodiment of a portable handheld scooping and shaping device 100 to shape snow in accordance with the present subject matter. One such device 100 comprises a snow shaping section 102, with the snow shaping section 102 comprising a scooping panel 110 with a distal device end 184 having a plurality of teeth 104 extending outwardly from the scooping panel 110, a first hollow rigid shaft segment 106 removably coupled to the snow shaping section 102, and a plurality of additional hollow rigid shaft segments 108a-108c configured to telescopically nest within at least one of the first hollow rigid shaft segment 106 and another of the plurality of additional hollow rigid shaft segments 108a-108c. The device 100 also comprises a handle 146 one of coupled and integrated to an end of at least one of the additional hollow rigid shaft segments 108a-108c.

The snow shaping section 102, in one embodiment, also includes a back panel 112, a first sidewall 114, a second sidewall 116 and a bottom panel 118. The back panel 112 of the snow shaping section 102 generally opposes the scooping panel 110 of the snow shaping section 102. The bottom panel 118 is positioned between the scooping panel 110 of the snow shaping section 102 and the back panel 112 of the snow shaping section 102. Similarly, the first sidewall 114 of the snow shaping section 102 is generally positioned opposite the second sidewall 116 of the snow shaping section 102 with the bottom panel 118 also positioned between the first sidewall 114 of the snow shaping section 102 and the second sidewall 116 of the snow shaping section 102.

In certain embodiments, the bottom panel 118 is substantially planar and includes a top surface 120 positioned opposite a bottom surface 122. In such an embodiment, the scooping panel 110 of the snow shaping section 102 extends from the bottom panel 118 in a first direction (as illustrated by arrow 124) at an obtuse angle relative to the top surface 120 of the bottom panel 118 of the snow shaping section 102. The back panel 112 of the snow shaping section 102 extends from the bottom panel 118 in a second direction (as illustrated by arrow 126) at an obtuse angle relative to the top surface 120 of the bottom panel 118 of the snow shaping section 102. Additionally, and as seen in FIG. 3, the back panel 312 may comprise a raised center portion 363 having a longer back panel length 373 than the other areas of the back panel 312.

Figure 3:
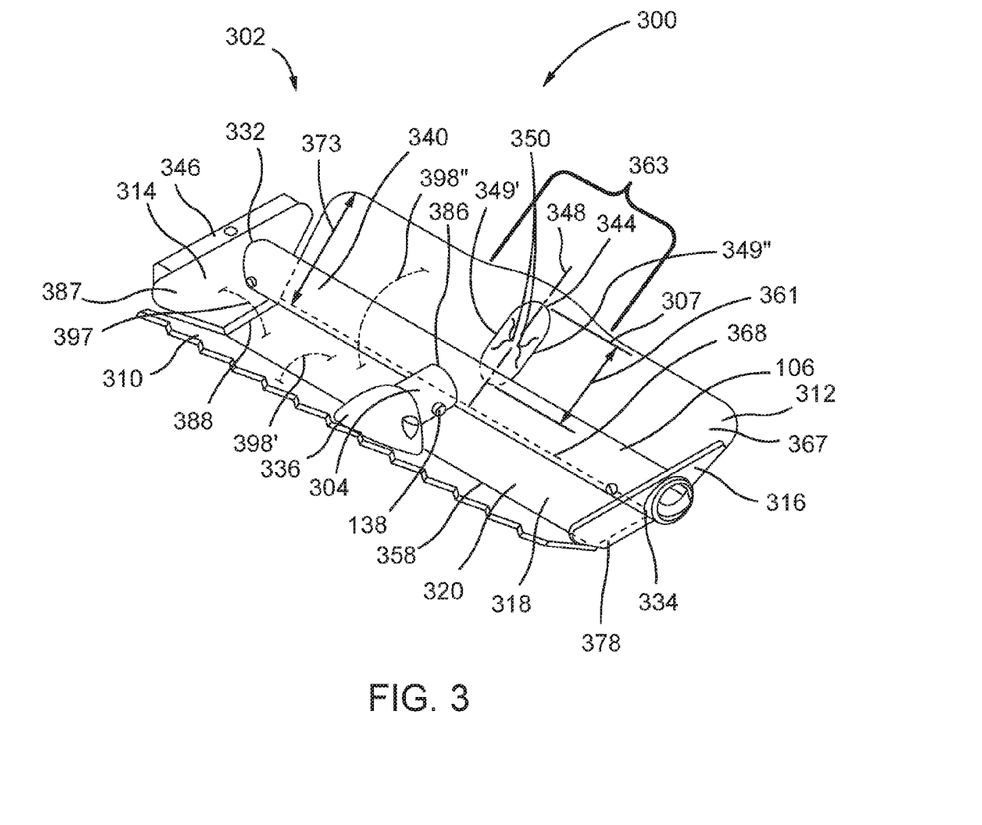
FIG. 3 depicts a perspective view illustrating one embodiment of the portable apparatus to shape snow positioned in a transport position in accordance with the present subject matter.

Turning now to FIG. 3, seen is one embodiment of the snow shaping section 302 showing a back panel bore 344. As seen in FIG. 1, the first hollow rigid shaft segment 106 may extend through the bore 144 and couple to the scooping panel 110. Returning now to FIG. 3, the back panel bore 344 is seen as comprising an oval. The back panel oval comprises a longitudinal axis 348 and a pair of opposing back panel oval sides 349', 349" dissected by the longitudinal axis 348. As seen, a center portion 350 of these sides 349', 349" comprises a substantially straight section, with these straight center portions 350 being substantially parallel. The center portions 350 may also be referred to as a center section 350.

The bottom panel 318 comprises a proximal end 368, distal end 358, first end 388 and second end 378, with the proximal end 368 opposing the distal end 358 and the first end 388 opposing the second end 378. The scooping panel 310 may extend from the distal end 358, with a first obtuse angle 398' separating a scooping panel front surface and the bottom panel top surface 320. Similarly, the back panel 312 may extend from the proximal end 368 with a second obtuse angle 398" separating a back panel front surface 367 from the bottom panel top surface 320. Additionally, the first sidewall 314 extends from the first end 388, with a first end front surface 387 and the bottom panel top surface 320 creating either a generally perpendicular or obtuse angle 397. Likewise, a front surface (not shown in FIG. 3) of the second sidewall 316 may also create a generally perpendicular or obtuse angle with the bottom panel top surface 320. It is contemplated that the angles described herein, such as, but not limited to, angles 398' 398" and 397 may comprise an angle greater than zero degrees but less than 180 degrees, a preferably between 90 degrees and 120 degrees.

Returning now to FIG. 1, seen is a device 100 in a scooping position. In the scooping position, the device may be used to scoop material such as, but not limited to, snow. In such a position, the first hollow rigid shaft segment 106 may be coupled to the scooping panel 110 in a device scooping position. For example, the first hollow rigid shaft segment 106 may extend through the bore 144 with a first end 156 of the first hollow rigid shaft segment 106 coupling to a shaft coupling mechanism 136, and the plurality of additional hollow rigid shaft segments 108a-108c may be connectively coupled to a second end 166 of the first hollow rigid shaft segment 106 to create an entire shaft 140 in an extended position. The shaft coupling mechanism 136, 336 may be coupled or integrated to the scooping panel 110 and may comprise a coupling tube 304, as seen in FIG. 3. The coupling tube 304 may have a cross-sectional oval shape similar to the shafts 106, 108a-108c and may comprise an oval length that is smaller than the oval length 171"" of the first hollow rigid shaft segment 106 so that the coupling tube 304 may be inserted into the first hollow rigid shaft segment 106 upon the first hollow rigid shaft segment 106 passing through the bore 344. As such, it is contemplated that a receiving end 386 of the coupling tube opposes and faces the bore 344. In looking at FIG. 3, seen is the device 300 in a device transport position. As seen, the entire shaft 340 is in a contracted position and placed through a first shaft receiving bore 332 and a second shaft receiving bore 334. In either position, the handle 146, 346 may extend perpendicularly to an entire shaft longitudinal axis, with the handle 146 being located at a proximal device end 174 in the scooping position seen in FIG. 1. Including views from FIG. 3, similar to the back panel bore 344, the first shaft receiving bore 332 and the second shaft receiving bore 334 may comprise a sidewall oval comprising an oval length 151, as seen in FIG. 1, which may be less than the oval length 361 seen in FIG. 3. The sidewall ovals may also comprise a longitudinal axis and a pair of opposing sidewall oval sides dissected by the longitudinal axis. Like the back panel 312, a center section of these sidewall oval sides may comprises a substantially straight section, with these straight center sections being substantially parallel. It is contemplated that the straight sections may also be referred to herein as a straight portion.

It is further contemplated that a cross-section, such as, but not limited to, cross-section B-B of the first hollow rigid shaft segment 106 and plurality of additional hollow rigid shaft segments 108a-108c may also comprise a shaft oval. The shaft oval may be similar to the sidewall oval and back panel oval, similarly comprising a longitudinal axis and a pair of opposing shaft oval sides dissected by the longitudinal axis. Like the back panel 312, a center section of these shaft oval sides may comprises a substantially straight section, with these straight center sections being substantially parallel. A shaft oval length 171' of the additional hollow shaft segment 108c may be less than a shaft oval length 171" of additional hollow shaft segment 108b, which may be less that a shaft oval segment length 171'" of additional hollow shaft segment 108a, which may be less than a shaft oval segment length 171"" of the first hollow rigid shaft segment, to enable the segments 106, 108a-108c to telescopically expand and contract. Additionally, the shaft oval segment length 171"" of the first hollow rigid shaft segment may be less than the length 151 of the sidewall ovals to enable placement of the contracted/collapsed entire shaft 140 in the bores 332, 334 when the device 300 is in the transport position, as seen in FIG. 3.

Figure 2A:
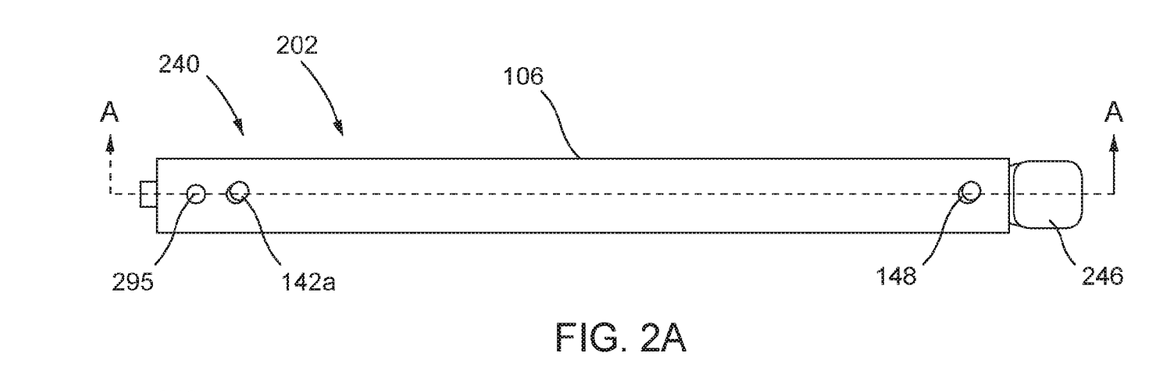
FIG. 2A depicts a side view illustrating one embodiment of a shaft in a retracted position in accordance with the present subject matter.
Figure 2B:
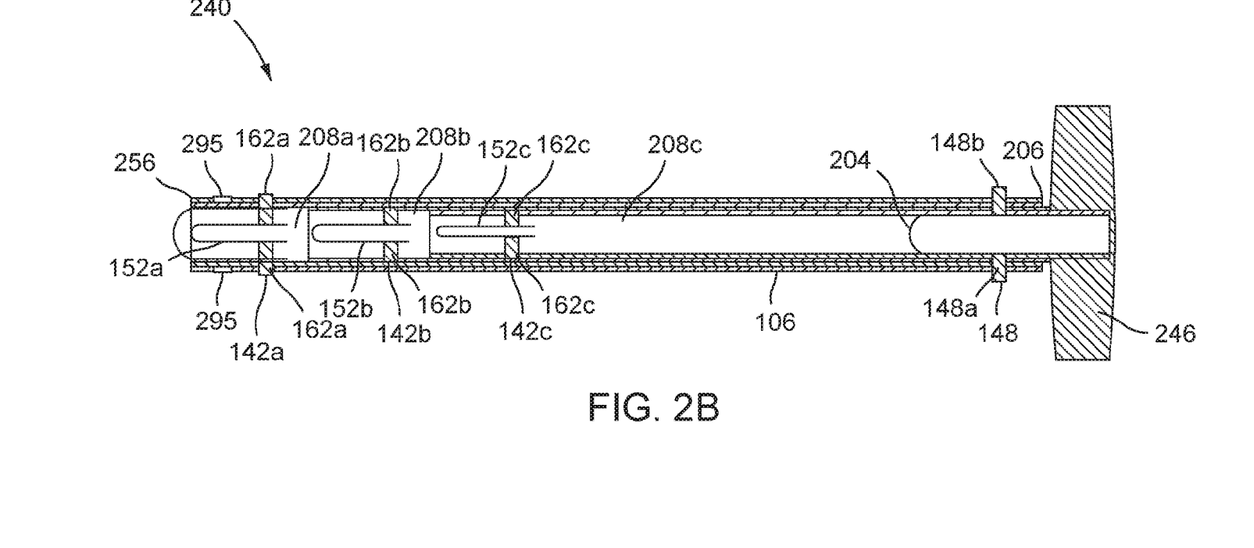
FIG. 2B depicts a cutaway side view illustrating another embodiment of the shaft in the retracted position in accordance with the present subject matter.

Turning now to FIGS. 2A and 2B, seen is a side view of the entire shaft 240 and handle 246 in the telescopically collapsed transport position, and a cross-sectional view of the entire shaft 240 and handle 246 in the telescopically collapsed transport position from FIG. 2A along line A-A, respectively. As seen, a first additional shaft section 208a comprises at least one biasing device 152a and a pair of plungers 162a, with the at least one biasing device 152a and plungers 162a comprising a push-pin 142a. Similarly, a second additional shaft section 208b comprises at least one biasing device 152b and plungers 162b comprising push-pin 142b, and the third additional shaft section 208c comprising at least one biasing device 152c and plungers 162c comprising push-pin 142c. As seen in FIG. 1, push-pins 142a-142c extend through bores in the first hollow rigid shaft segment 106 and in each of the additional hollow rigid shaft segment 108a-108c to engage the adjacent hollow rigid shaft segment in the extended position. In certain embodiments, a length of the entire shaft 140 may be adjusted to accommodate a taller or shorter user by engaging or disengaging the push-pins 142a-142c with the bores of the first hollow rigid shaft segment 106 and in each of the additional hollow rigid shaft segment 108a-108c to collapse and/or add additional segments to the entire shaft 140. In certain embodiments the length of the entire shaft 140 may be adjusted to accommodate a user's preferences.

Figure 4:
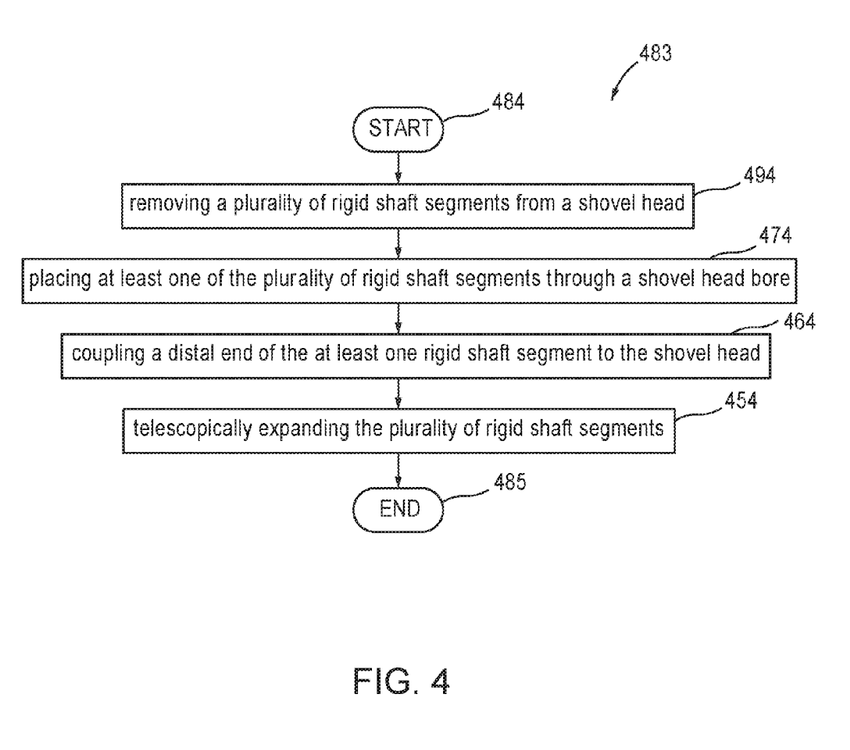
FIG. 4 depicts a method according to one embodiment of the invention.

Turning now to FIG. 4, seen is a method 483 of expanding a shovel. One such shovel comprises the device 100, 300, seen and described with reference to FIGS. 1-3. At 494, the method 483 comprises removing a plurality of rigid shaft segments from a shovel head. For example, the shovel head may comprise a snow receiving space 130 seen in FIG. 1. Furthermore, removing the plurality of rigid shaft segments may comprise sliding the entire shaft 240, as seen in FIG. 2A, through the first shaft receiving bore 332 and second shaft receiving bore 334, as seen in FIG. 3.

At 474, the method 483 comprises placing at least one of the plurality of rigid shaft segments through a shovel head bore. Here, one embodiment of this method 483 may comprise inserting a first end 156 of the first hollow rigid shaft segment 106 into the back panel bore 344 towards the scooping panel 310. At 464, the method 483 comprises coupling a distal end of the at least one rigid shaft segment to the shovel head. Here, the distal end may comprise the first end 156 and the shovel head may comprise the shaft coupling mechanism 336. Furthermore, in order to couple the first end 156 to the shaft coupling mechanism after removing a collapsed entire shaft 340 from the snow receiving space 130, it is contemplated that shaft bores 295 may need to be exposed for receiving a shaft coupling mechanism push pin 138. The shaft coupling mechanism push pin 138 may be located on a scooping panel 110. In order to expose these bores 295, the first hollow rigid shaft segment 106 may need to be at least partially expanded from the collapsed position. For example, pushpins 148b, coupled to a proximal end 152 of the additional segment 108c may be depressed to remove the pushpins 148b from a bore proximate to the second end 266, 166 of the first hollow rigid shaft segment 106. Upon depressing the pushpins 148b, the first end 156, 256, of first hollow rigid shaft segment 106 may be slid away from the handle 246, exposing the bores 295. Upon exposure, the bores 295 may be aligned with, and receive, the shaft coupling mechanism push pin 138.

At 454, the method 483 comprises telescopically expanding the plurality of rigid shaft segments. In one such method, this may occur by implementing the steps described above with reference to step 464, where the pushpins 148b are depressed and the additional segments 108a-108c are slid away from the handle 246. The pushpins 142a-142c coupled to the additional segments 108a-108c may then expand into bores located near a proximal end of each of the additional segments 108a-108c. Similarly, in order to place the device 300 in the transport position, as seen in FIG. 3, the method 483 may also comprise placing the plurality of shaft segments 106, 108a-108c into a pair of sidewall bores 332, 334 prior to removing the segments from 106, 108a-108c the shovel head. In order to place the plurality of shaft segments 106, 108a-108c into a pair of sidewall bores 332, 334, the pushpins 138, 142a-142c, 1448 may be depressed to collapse the entire shaft 140.

It is further contemplated that placing the plurality of shaft segments 106, 108a-108c into a pair of sidewall bores 332, 334 may comprise aligning a pair of substantially parallel shaft center portions with a pair of substantially parallel sidewall bore center portions. Furthermore, placing at least one of the plurality of rigid shaft segments 106, 108a-108c through a shovel head bore 344 may comprise aligning the pair of substantially parallel shaft center portions with a substantially parallel shovel head bore center portion. In such an method, the shovel head bore 344 may comprise a pair of substantially parallel shovel head bore center portions 350 and the sidewall bores 334, 344 may also comprise a pair of substantially parallel sidewall bore center portions similar to the shovel head bore center portions 350. Additionally, a cross-section of the plurality of rigid shaft segments 106, 108a-108c may also comprise a pair of substantially parallel shaft center portions similar to the shovel head bore center portions 350.

In describing a snow shaping an shoveling system it is contemplated that the teeth 104 extend outwardly from a leading edge 128 of the scooping panel 110 of the snow shaping section 102. As depicted, the leading edge 128 of the scooping panel 110 of the snow shaping section 102 is an edge disposed opposite the back panel 112 of the snow shaping section 102.

In one embodiment, the first sidewall 114 and the second sidewall 116 of the snow shaping section 102 extend from the bottom panel 118 in a direction opposite the bottom surface 122 of the bottom panel 118. In such an embodiment, the scooping panel 110, the back panel 112, the first sidewall 114, the second sidewall 116, and the bottom panel 118 define the snow receiving space 130. In use the leading edge 128 of the scooping panel 110 of the snow shaping section 102 may be used to scrape and shape snow to form terrain park features. As the snow is scraped using the leading edge 128 of the scooping panel 110 of the snow shaping section 102, the snow is collected in the snow receiving space 130 for removal or to otherwise transport the snow.

As discussed above, portable device 100 to shape snow, in one embodiment, includes a first hollow rigid shaft segment 106. The first hollow rigid shaft segment 106 is removably coupleable to the snow shaping section 102. In an exemplary embodiment, the first hollow rigid shaft segment 106 is coupleable to the scooping panel 110 of the snow shaping section 102. In one embodiment, such as the embodiment illustrated in FIG. 1, the device 100 may include a shaft coupling mechanism 136 coupled to the scooping panel 110 of the snow shaping section 102. At least a portion of the shaft coupling mechanism 136 is received within the first hollow rigid shaft 106 to removably secure the first hollow rigid shaft 106 to the scooping panel 110 of the snow shaping section 102.

In one embodiment, the first hollow rigid shaft segment 106 is removably coupled to the shaft coupling mechanism 136 with a push-pin 138 or other releasing mechanism as is known in the art. In such an embodiment, the first hollow rigid shaft 106 may be decoupled from the snow shaping section 102 for ease of transport in reaching backcountry destinations.

The device 100 includes a plurality of additional hollow rigid shaft segments 108a-108 c. Each additional hollow rigid shaft segment 108a-108c is configured to nest within either the first hollow rigid shaft segment or another one of the additional hollow rigid shaft segments 108a-108c. For example, in the embodiment illustrated in FIG. 1, the first hollow rigid shaft segment 106 has an inner diameter that is larger than an outer diameter of the additional rigid shaft segment 108a. Thus, the additional rigid shaft segment 108a is slideable within the first hollow rigid shaft segment 106 such that the additional rigid shaft segment 108a nests within the first hollow rigid shaft segment 106 when the apparatus is positioned in a retracted position 202 (See FIGS. 2A and 2B). Each of the other additional hollow rigid shaft segments 108b and 108c are configured to nest within one another in a substantially similar manner such that the entire shaft 140 is telescopically extendable and retractable between an extended position 101 and a retracted position 202.

In one embodiment, the back panel 112 of the snow shaping section 102 includes an back panel bore 144 disposed there through. In such an embodiment, the first hollow rigid shaft 106 extends through the back panel bore 144 in the back panel 112 of the snow shaping section 102 and is removably coupleable to the scooping panel 110 of the snow shaping section 102 to support the scooping panel 110 of the snow shaping section 102. Because the first hollow rigid shaft 106 extends through the back panel bore 144 in the back panel 112 of the snow shaping section 102, the first hollow rigid shaft 106 also supports the back panel 112 of the snow shaping section.

The device 100, in certain embodiments, also includes a handle 146. In one embodiment, the handle 146 is removably coupleable to the first hollow rigid shaft segment 106. In such an embodiment, the handle 146 extends substantially perpendicular to the first hollow rigid shaft segment 106 with the handle 146 positioned in a coupled position as shown in FIG. 1. The handle 146, in an exemplary embodiment, is removable by means of push-pin 148 for ease of transport.

In other embodiments, the handle 146 is also removably coupleable to at least one of the plurality of additional hollow rigid shaft segments 108a-108c. This allows the length of the shaft 140 to be adjusted to accommodate a taller or shorter user or to accommodate a user's preferences.

As discussed above, FIG. 1 depicts the device 100 for shaping snow with the shaft 140 positioned in the extended position 101. One of skill in the art will recognize that with the shaft 140 positioned in the extended position 101, the device 100 is unwieldy and difficult to transport. Accordingly, in certain embodiments, in order to conveniently transport the device 100, the shaft 140 may be positioned in the retracted position 202 as shown in FIGS. 2A and 2B.

For example, FIG. 2A depicts a side view illustrating one embodiment of the shaft 140 of device 100 in the retracted position 202 in accordance with the present subject matter. In the embodiment illustrated in FIG. 2A, the additional hollow rigid shaft segments 108a-108c are successively nested within one another and within the first hollow rigid shaft segment 106. Push-pin 142a and push-pin 148 extend through holes in the first hollow rigid shaft segment 106 to maintain the additional hollow rigid shaft segments 108a-108c nested within the first hollow rigid shaft segment 106.

FIG. 2B is a cutaway side view taken along line A-A illustrating another embodiment of the shaft 140 of device 100 in the retracted position 202 in accordance with the present subject matter. As discussed above, in certain embodiments, the additional hollow rigid shaft segments 108a-108c are configured to nest within one another and are further configured to nest within the first hollow rigid shaft segment 106.

The push-pins 142a-142c and 148, in an exemplary embodiment, include two pinning elements and a biasing element. For example, push-pin 148 includes pinning elements 148a and 148b and a biasing element 204. The biasing element 204 biases the pinning elements 148a and 148b in an engaging position wherein the pinning elements 148a and 148b extend through holes in the first rigid shaft segment 106 and through holes in the additional hollow rigid shaft segments 108a-108c. In this manner the pinning elements 148a and 148b engage the first rigid shaft segment 106 and the additional hollow rigid shaft segments 108a-108c to maintain the shaft 140 in the retracted position 202. One of skill in the art will recognize that push-pins 142a-142c are constructed and function in a manner substantially similar to the manner in which push-pin 148 is constructed and functions. Accordingly, push-pins 142a-142c each include two pinning elements and a biasing element.

As discussed above, many snow sport enthusiasts prefer to venture into the backcountry to create their own terrain parks. For such enthusiasts it is important that the device 100 is easily transportable. Accordingly, the device 100 should easily breakdown to a size that can fit within a backpack or other transporting device. The present subject matter discloses such an apparatus.

For example, FIG. 3 is a perspective view illustrating another embodiment of the portable device 100 to shape snow positioned in a transport position 302 in accordance with the present subject matter. In the embodiment illustrated in FIG. 3, the shaft 140 has been disengaged from the shaft coupling mechanism 136 and has been positioned in the retracted position 202 as shown in FIGS. 2A and 2B. To remove the shaft 140 from the shaft coupling mechanism 136 a user depresses push-pin 138 and slides the first rigid hollow shaft segment 106 off of a shaft coupling tube 304 which is part of the shaft coupling mechanism 136.

With the shaft 140 positioned in the retracted position 202, the shaft 140 is ready to be positioned in the transport position 302. The user extends the first hollow rigid shaft segment 106 and the plurality of additional hollow rigid shaft segments 108a-108 c extend through the first shaft receiving bore 132 and through the second shaft receiving bore 134. In certain embodiments, push-pin 148 and push-pin 142a should be depressed when they encounter the first sidewall 114 as the shaft 140 is slid into the first shaft receiving bore 132. Once push-pin 148 has passed through the first shaft receiving bore 132, push-pin 148 returns to an extended position effectively locking the shaft 140 in the transport position 302. Thus, in the transport position 302 the device 100 is compact and easily transportable.

Figure 5:
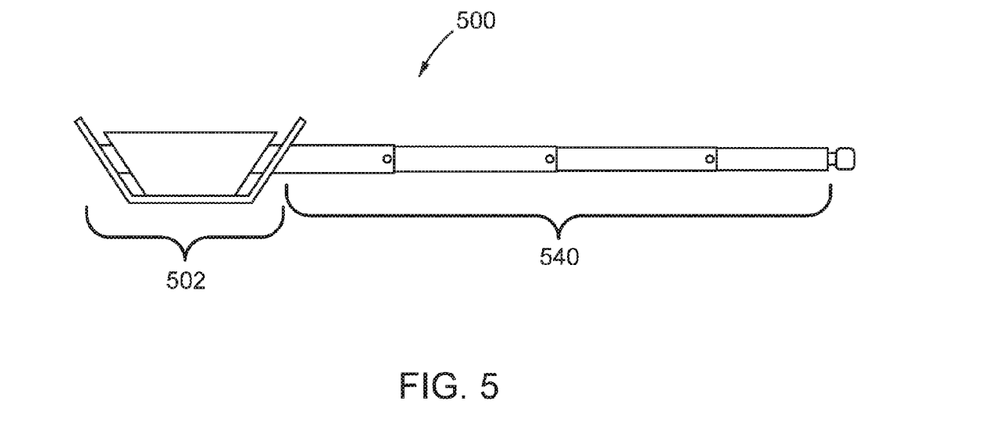
FIG. 5 depicts a side view of the device in the scooping position according to one embodiment of the invention.
Figure 6:
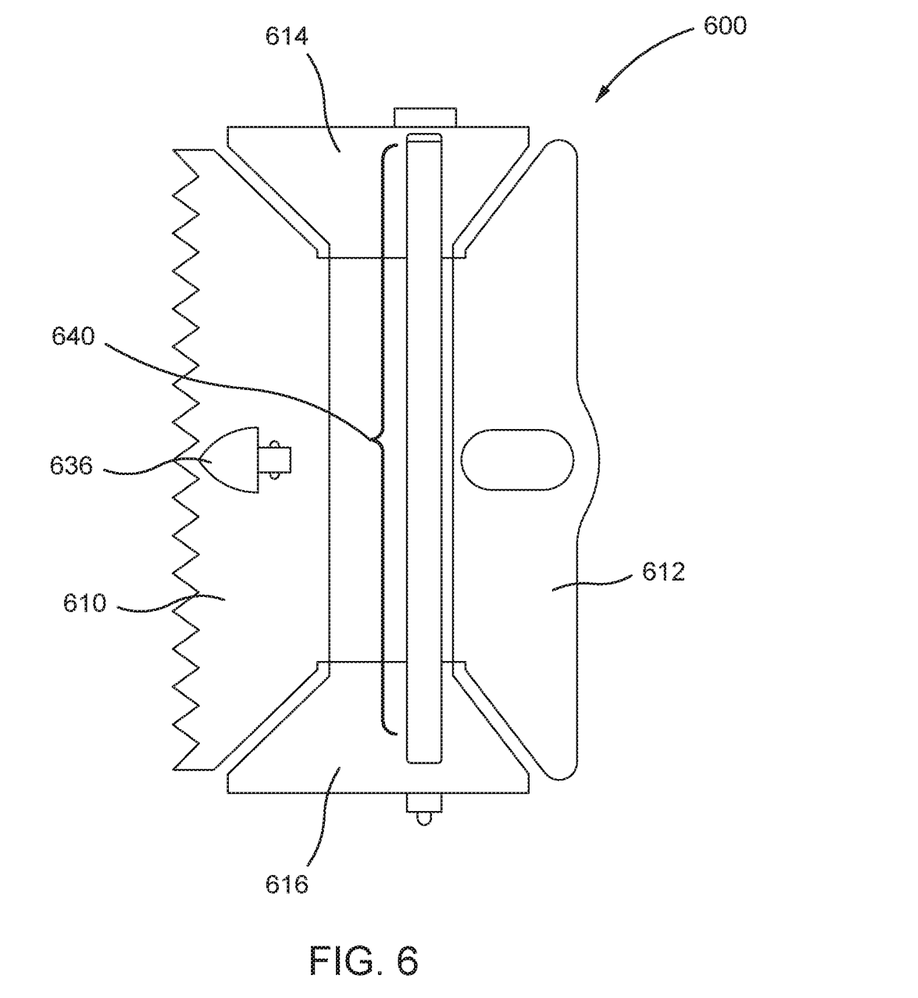
FIG. 6 depicts a top view of the device in the transport position according to one embodiment of the invention.

FIG. 5 shows a side view of the device 500 in the scooping position showing the snow shaping portion 502 entire shaft 540. FIG. 6 displays a top view of the device 600 in the transport position, showing the scooping panel 610, back panel 612, first sidewall 614, second sidewall 616, entire shaft 640 and shaft coupling mechanism 636.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A handheld scooping and shaping device comprising:
a snow shaping section, the snow shaping section comprising
(a) a scooping panel, the scooping panel comprising a distal device end, the distal device end having a plurality of teeth extending outwardly from the scooping panel;
(b) a back panel, the scooping panel generally opposing the back panel;
(c) a first sidewall,
(d) a second sidewall, the second sidewall substantially opposing the first sidewall; and
(e) a bottom panel, the bottom panel one of coupled and integrated to the, scooping panel, back panel, first sidewall, and second sidewall; the device further comprising
a first hollow rigid shaft segment removably coupled to the snow shaping section;
a plurality of additional hollow rigid shaft segments, each additional hollow rigid shaft segment configured to nest within at least one of the first hollow rigid shaft segment and another of the plurality of additional hollow rigid shaft segments; and
a handle one of coupled and integrated to an end of at least one of the additional hollow rigid shaft segments; and wherein
the first hollow rigid shaft segment is shaped to removably couple to the scooping panel in a device scooping position;
at least one of the first sidewall and the second sidewall includes at least one shaft receiving bore; and
the at least one shaft receiving bore is shaped to receive the first hollow rigid shaft segment and the plurality of additional hollow rigid shaft segments in a device transport position.

2. The device of claim 1, wherein,
the back panel comprises a back panel bore; and
the first hollow rigid shaft segment extends from the scooping panel through the back panel bore.

3. The device of claim 2 wherein,
the back panel bore comprises a back panel elongated slot;
the back panel elongated slot comprises,
a longitudinal axis, and
a pair of opposing sides dissected by the longitudinal axis;
a center portion of each of the sides comprises a straight portion; and
the straight portions are substantially parallel.

4. The device of claim 2 further comprising a shaft coupling mechanism, the shaft coupling mechanism one of coupled and integrated to the scooping panel opposite the back panel bore; and wherein, the shaft coupling mechanism is configured to receive a first end of the first hollow rigid shaft segment section in the device scooping position.

5. The device of claim 4 wherein, one of the shaft coupling mechanism and the first hollow rigid shaft comprises at least one biasing device and a pair of plungers and the other of the shaft coupling mechanism and the first hollow rigid shaft comprises a pair of plunger bores for receiving the plungers.

6. The device of claim 5 wherein, the first hollow rigid shaft segment and plurality of additional hollow rigid shaft segments comprise a telescoping shaft, each of the additional hollow rigid shaft segments comprising at least one of a pair of biased plungers and a pair of bores, with each of the pair of bores for receiving a pair of biased plunger on an adjacent hollow rigid shaft segment.

7. The device of claim 1, wherein,
the bottom panel comprises a top surface, a proximal end, a distal end, a first end and a second end;
the proximal end opposes the distal end;
the first end opposes the second end;
the proximal end and distal end are substantially perpendicular to the first end and the second end;
the scooping panel extends from the distal end at a first obtuse angle relative to the top surface in a first direction; and
the back panel extends from the proximal end at a second obtuse angle relative to the top surface in a second direction, the second direction being different than the first direction.

8. The device of claim 7, wherein
the first sidewall extends from the first end at one of a generally perpendicular angle and an obtuse angle relative to the top surface;
the second sidewall extends from the second end at one of a generally perpendicular angle and an obtuse angle relative to the top surface; and
the scooping panel, back panel, first sidewall, second sidewall, and bottom panel define a snow receiving space.

9. The device of claim 8 wherein,
the back panel comprises a back panel front surface;
the scooping panel comprises a scooping panel front surface; and
the angle of the back panel front surface relative to the scooping panel front surface is greater than 0 degrees and less than 180 degrees.

10. The device of claim 9 wherein, the angle comprises an angle between 90 degrees and 120 degrees.

11. The device of claim 1, wherein,
the handle extends substantially perpendicular to the additional hollow rigid shaft segments; and the handle is located at a proximal device end in the device scooping position.

12. The device of claim 1, wherein,
the first sidewall includes a first shaft receiving bore;
the second sidewall includes a second shaft receiving bore;
the first hollow rigid shaft segment and the plurality of additional hollow rigid shaft segments extend through the first shaft receiving bore and through the second shaft receiving bore in the device transport position.

13. The device of claim 12 wherein,
each of the first shaft receiving bore and the second shaft receiving bore comprise a sidewall oval;
the sidewall oval comprises,
a longitudinal axis, and
a pair of opposing sidewall oval sides dissected by the longitudinal axis;
a center portion of the sidewall oval sides comprises a straight portion; and
the straight portions of the opposing sidewall oval sides are substantially parallel.

14. The device of claim 13 wherein,
a cross-section of the first hollow rigid shaft segment and the plurality of additional hollow rigid shaft segments comprises a shaft oval;
the shaft oval comprises,
a longitudinal axis, and
a pair of opposing shaft oval sides dissected by the longitudinal axis;
a center portion of the shaft oval sides comprises a straight portion; and
the straight portions of the opposing shaft oval sides are substantially parallel.

15. A method of expanding a shovel comprising,
removing a plurality of rigid shaft segments from a shovel head;
placing a distal end of at least one of the plurality of rigid shaft segments through a shovel head bore;
coupling the distal end of the at least one rigid shaft segment to the shovel head; and
telescopically expanding the plurality of rigid shaft segments; and wherein,
the removing a plurality of rigid shaft segments comprises sliding the plurality of rigid shaft segments through a sidewall bore in at least one shovel head sidewall.

16. The method of claim 15 further comprising, placing the plurality of rigid shaft segments into a pair of sidewall bores prior to removing the plurality of rigid shaft segments from the shovel head.

17. The method of claim 15, wherein,
the shovel head bore comprises a pair of substantially parallel shovel head bore center portions;
the sidewall bore comprises a pair of substantially parallel sidewall bore center portions;
a cross-section of the plurality of rigid shaft segments comprise a pair of substantially parallel shaft center portions;
placing the plurality of rigid shaft segments into the pair of sidewall bores comprises aligning the pair of substantially parallel shaft center portions with a pair of substantially parallel sidewall bore center portions; and
placing at least one of the plurality of rigid shaft segments through a shovel head bore comprises aligning a pair of substantially parallel shaft center portions with the substantially parallel shovel head bore center portions.

18. The method of claim 15 wherein,
the shovel head comprises a scooping panel; and
coupling a distal end of the at least one rigid shaft segment to the shovel head comprises coupling the distal end of the shaft segment to the scooping panel.

19. A portable snow shaping system, the system comprising:
a substantially planar bottom panel comprising a top surface disposed opposite a bottom surface;
a distal end;
a scooping panel;
a back panel disposed opposite the scooping panel with the bottom panel disposed between the scooping panel and the back panel;
a first sidewall;
a first shaft receiving bore disposed within the first sidewall;
a second sidewall disposed opposite the first sidewall with the bottom panel disposed between the first sidewall and the second sidewall, wherein the first sidewall and the second sidewall extend from the bottom panel in a direction opposite the bottom surface of the bottom panel;
a second shaft receiving bore disposed within the second sidewall;
a first hollow rigid shaft segment removably coupleable to the scooping panel;
a plurality of additional hollow rigid shaft segments, each additional hollow rigid shaft segment configured to nest within at least one of the first hollow rigid shaft segment and another of the plurality of additional hollow rigid shaft segments; and
wherein, in a device transport position, the first hollow rigid shaft segment and the plurality of additional hollow rigid shaft segments extend through the first shaft receiving bore and through the second shaft receiving bore.

* * * * *